(12) United States Patent
Cooley

(10) Patent No.: US 7,921,159 B1
(45) Date of Patent: Apr. 5, 2011

(54) COUNTERING SPAM THAT USES DISGUISED CHARACTERS

(75) Inventor: Shaun P. Cooley, El Segundo, CA (US)

(73) Assignee: Symantec Corporation, Mountain View, CA (US)

( * ) Notice: Subject to any disclaimer, the term of this patent is extended or adjusted under 35 U.S.C. 154(b) by 1454 days.

(21) Appl. No.: 10/686,356

(22) Filed: Oct. 14, 2003

(51) Int. Cl.
*G06F 15/16* (2006.01)
*G06K 9/00* (2006.01)

(52) U.S. Cl. ......... 709/206; 709/207; 709/246; 382/165

(58) Field of Classification Search .................. 709/246, 709/206; 345/589, 594; 356/405; 382/165
See application file for complete search history.

(56) References Cited

U.S. PATENT DOCUMENTS

| | | | |
|---|---|---|---|
| 4,758,885 A * | 7/1988 | Sasaki et al. .................. | 358/520 |
| 4,770,534 A * | 9/1988 | Matsuki et al. ................ | 356/405 |
| 5,675,710 A | 10/1997 | Lewis | |
| 5,751,847 A * | 5/1998 | Wuyts ........................... | 382/165 |
| 5,826,249 A | 10/1998 | Skeirik | |
| 5,889,885 A * | 3/1999 | Moed et al. .................... | 382/172 |
| 6,023,723 A | 2/2000 | McCormick et al. | |
| 6,052,709 A | 4/2000 | Paul | |
| 6,072,942 A | 6/2000 | Stockwell et al. | |
| 6,148,102 A * | 11/2000 | Stolin .......................... | 382/164 |
| 6,161,130 A | 12/2000 | Horvitz et al. | |
| 6,167,434 A | 12/2000 | Pang | |
| 6,249,807 B1 | 6/2001 | Shaw et al. | |
| 6,253,169 B1 | 6/2001 | Apte et al. | |
| 6,282,565 B1 | 8/2001 | Shaw et al. | |
| 6,289,416 B1 | 9/2001 | Fukushima et al. | |
| 6,298,351 B1 | 10/2001 | Castelli et al. | |
| 6,324,569 B1 | 11/2001 | Ogilvie et al. | |
| 6,347,310 B1 | 2/2002 | Passera | |
| 6,370,526 B1 | 4/2002 | Agrawal et al. | |
| 6,397,200 B1 | 5/2002 | Lynch, Jr. et al. | |
| 6,397,215 B1 | 5/2002 | Kreulen et al. | |
| 6,421,709 B1 | 7/2002 | McCormick et al. | |
| 6,424,960 B1 | 7/2002 | Lee et al. | |
| 6,442,606 B1 | 8/2002 | Subbaroyan et al. | |
| 6,456,991 B1 | 9/2002 | Srinivasa et al. | |
| 6,487,586 B2 | 11/2002 | Ogilvie et al. | |
| 6,493,007 B1 | 12/2002 | Pang | |
| 6,502,082 B1 | 12/2002 | Toyama et al. | |
| 6,505,167 B1 | 1/2003 | Horvitz et al. | |
| 6,505,256 B1 * | 1/2003 | York ............................. | 709/246 |
| 6,546,416 B1 | 4/2003 | Kirsch | |
| 6,640,301 B1 | 10/2003 | Ng | |
| 6,643,685 B1 | 11/2003 | Millard | |
| 6,650,890 B1 | 11/2003 | Irlam et al. | |

(Continued)

OTHER PUBLICATIONS

Outlook.spambully.com web pages [online] Spam Bully [retrieved Jan. 16, 2003] Copyright 2002, Retrieved from the Internet <URL: http://outlook.spambully.com/about.php>.

(Continued)

*Primary Examiner* — Joseph Thomas
*Assistant Examiner* — Tae K Kim
(74) *Attorney, Agent, or Firm* — Fenwick & West LLP

(57) ABSTRACT

Computer-implemented methods, apparati, and computer-readable media for countering spam that disguises characters within an electronic message (1). A method embodiment of the present invention comprises locating (36) portions of an electronic message (1) where the difference between foreground color and background color is negligible; deleting (37) from the electronic message (1) foreground characters from said portions, to form a redacted electronic message; and forwarding (33) the redacted electronic message to a spam filter (23).

20 Claims, 3 Drawing Sheets

U.S. PATENT DOCUMENTS

| | | | |
|---|---|---|---|
| 6,654,787 B1 | | 11/2003 | Aronson et al. |
| 6,687,740 B1 | | 2/2004 | Gough |
| 6,691,156 B1 | | 2/2004 | Drummond et al. |
| 6,697,942 B1 | | 2/2004 | L'Heureux |
| 6,701,347 B1 | | 3/2004 | Ogilvie |
| 6,711,608 B1 | | 3/2004 | Ogilvie |
| 6,732,157 B1 | | 5/2004 | Gordon et al. |
| 6,748,111 B1 | * | 6/2004 | Stolin et al. .................... 382/176 |
| 6,757,713 B1 | | 6/2004 | Ogilvie et al. |
| 6,757,830 B1 | | 6/2004 | Tarbotton et al. |
| 6,809,741 B1 | * | 10/2004 | Bates et al. ................... 345/597 |
| 6,842,773 B1 | * | 1/2005 | Ralston et al. ................ 709/206 |
| 6,901,163 B1 | * | 5/2005 | Pearce et al. .................. 382/165 |
| 7,197,539 B1 | * | 3/2007 | Cooley ........................... 709/206 |
| 2002/0016735 A1 | * | 2/2002 | Runge et al. ..................... 705/14 |
| 2002/0038308 A1 | | 3/2002 | Cappi |
| 2002/0087641 A1 | | 7/2002 | Levosky |
| 2002/0087649 A1 | | 7/2002 | Horvitz |
| 2002/0113801 A1 | * | 8/2002 | Reavy et al. ................... 345/589 |
| 2002/0138525 A1 | | 9/2002 | Karadimitriou et al. |
| 2002/0138581 A1 | | 9/2002 | MacIntosh et al. |
| 2002/0147694 A1 | | 10/2002 | Dempsey et al. |
| 2002/0147782 A1 | | 10/2002 | Dimitrova et al. |
| 2002/0163527 A1 | * | 11/2002 | Park ............................... 345/594 |
| 2002/0199186 A1 | | 12/2002 | Ali et al. |
| 2002/0199194 A1 | | 12/2002 | Ali |
| 2003/0033587 A1 | | 2/2003 | Ferguson et al. |
| 2003/0149726 A1 | | 8/2003 | Spear |
| 2003/0167311 A1 | | 9/2003 | Kirsch |
| 2003/0191969 A1 | | 10/2003 | Katsikas |
| 2003/0200334 A1 | | 10/2003 | Grynberg |
| 2003/0220978 A1 | | 11/2003 | Rhodes |
| 2003/0229672 A1 | | 12/2003 | Kohn |
| 2003/0233415 A1 | | 12/2003 | Beyda |
| 2004/0003283 A1 | | 1/2004 | Goodman et al. |
| 2004/0024823 A1 | | 2/2004 | Del Monte |
| 2004/0054887 A1 | | 3/2004 | Paulsen et al. |
| 2004/0064734 A1 | | 4/2004 | Ehrlich |
| 2004/0068534 A1 | | 4/2004 | Angermayr et al. |
| 2004/0073617 A1 | | 4/2004 | Milliken et al. |
| 2004/0093383 A1 | | 5/2004 | Huang et al. |
| 2004/0093384 A1 | | 5/2004 | Shipp |
| 2004/0111480 A1 | | 6/2004 | Yue |
| 2004/0148358 A1 | | 7/2004 | Singh et al. |
| 2004/0167964 A1 | * | 8/2004 | Rounthwaite et al. ........ 709/206 |
| 2004/0205173 A1 | | 10/2004 | Hall |
| 2004/0221062 A1 | * | 11/2004 | Starbuck et al. .............. 709/246 |
| 2005/0198160 A1 | * | 9/2005 | Shannon et al. .............. 709/206 |

OTHER PUBLICATIONS outlook.spambully.com web pages [online]. Spam Bully [retrieved Jan. 16, 2003]. Copyright 2002. Retrieved from the Internet: <URL: http://outlook.spambully.com/about.php >.

cauce.org web pages [online]. Coalition Against Unsolicited Commercial Email [retrieved Mar. 17, 2003]. Retrieved from the Internet: <URL: http://www.cauce.org/about/problem.shtml>.

Wikipedia.org web pages (online). Wikipedia (retrieved Mar. 17, 2003). Retrieved from the Internet: <URL: http://www.wikipedia.org/w/wiki.phtml?title= Machine learning & printable=yes>.

NBEC/NWOCA Anti-Spam Tools, [online] [retrieved Jul. 7, 2004] retrieved from http://home.nwoca.org, Jul. 7, 2004.

Kularski, C. "Compound Procedures for Spam Control," Highland School of Technology, Jan. 2004.

"Technical Responses to Spam," Nov. 2003, Taughannock Networks.

Cranor, Faith, L., LaMacchia, Brian A., "Spam!" Communications of the ACM, vol. 41, No. 8, pp. 74-83, Aug. 1998. U.S.A.

How it Works:Spam Recognition, http://www.death2spam.net/docs/classifier.html, retrieved Aug. 18, 2005, U.S.A.

Cavnar, William B. et al., "N-Gram-Based Text Categorization", Proceedings of SDAIR-94, 3rd Annual Symposium on Document Analysis and Information Retrieval, Las Vegas, NV., USA, Apr. 13, 1994.

"N-Gram-Based Text Categorization", 2 pages, downloaded from http://citeseer.ist.psu.edu/68861.html, Aug. 25, 2005 U.S.A.

TextCat Language Guesser, 2 pages, downloaded from http:/odur.let.rug.nl/~vannoord/Textcat/ on Aug. 25, 2005., U.S.A.

Spam Assassin, The Apache SpamAssasin Project, 2 pages, downloaded from http:/spamassasin.apache.org on Aug. 25, 2005, U.S.A.

Basis Technology's Rosette Language Identifier, 2 pages, downloaded from http:/www.basistech.com/language-identification/ on Aug. 25, 2005, U.S.A.

Karp-Rabin algorithm, 3 pages, downloaded from http:/www-igm.univ-mlv.fr/~lecroq/string/node5.html on Sep. 1, 2005, U.S.A.

Rabin-Karp string search algorithm, 5 pages, downloaded from http://en.wikipedia.org/wiki/Rabin-Karp_string_search_alogrithm on August 31, 2005 U.S.A.

The Rabin-Karp algorithm, String searching via Hashing, 5 pages, downloaded from http://www.eecs.harvard.edu/~ellard/Q-97/HTML/root/node43 on Aug. 31, 2005 U.S.A.

* cited by examiner

COUNTERING SPAM THAT USES DISGUISED CHARACTERS

TECHNICAL FIELD

This invention pertains to the field of countering spam that infects electronic messages by disguising characters.

BACKGROUND ART

As used throughout this specification including claims, "spam" is any electronic message that is unwanted by the recipient; and a "clean" electronic message is one that is not spam. The amount of spam sent over computer networks has increased with the increasing popularity of electronic messaging schemes such as e-mail. Spam filters have been designed to counter the flood of spam. However, spammers have employed various tricks to neutralize the spam filters and thereby place their unwanted messages in front of recipients.

Once such trick employed by spammers (illustrated in FIG. 1) is to break up the electronic message 1 into two portions: a visible portion 2 that is visible to the human recipient and readable by the spam filter, and an invisible portion 3 that is invisible to the human recipient but nonetheless readable by the spam filter. The visible portion 2 contains the spam message, typically between 10 and 20 words long, while the invisible portion 3 is much longer, typically between 1000 and 2000 words long. The invisible portion 3 contains characters that lull the spam filter into concluding that the message 1 is clean. In the case where the spam filter is a statistical filter (such as a Bayesian filter, a neural network, or a support vector machine), the invisible portion 3 of the message contains many more words than the visible portion 2. Furthermore, the invisible text 3 contains words that are innocuous. Since the spam filter processes many more innocuous words from the invisible portion 3 than spam words from the visible portion 2, the spam filter erroneously concludes that, as a whole, the message 1 is clean.

This spamming technique can be used with any spam filter that takes into account characters within the message 1. In the example shown in FIG. 1, if the spam filter has been programmed to conclude that a message 1 is clean when the word "cancer" appears in the message 1, the spammer can place the word "cancer" in the invisible portion 3 of the message, counteracting the effect of the word "breast" in the visible portion 2 of the message. (The word "breast" would normally trigger the spam filter to conclude that the message 1 contains spam.)

The present invention provides methods, apparati, and computer readable media to counter the above-described spamming technique.

DISCLOSURE OF INVENTION

Computer-implemented methods, apparati, and computer-readable media for countering spam that disguises characters within an electronic message (1). A method embodiment of the present invention comprises locating (36) portions of the electronic message (1) where the difference between foreground color and background color is negligible; deleting (37) from the electronic message (1) foreground characters from said portions, to form a redacted electronic message; and forwarding (33) the redacted electronic message to a spam filter (23).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

As used throughout this specification including claims, the following terms have the following meaning:

"HTML" is HyperText Markup Language, a common language used by the World Wide Web sector of the Internet.

"Electronic message" 1 is any message that is in electronic or digital form. Thus, for example, electronic message 1 can be e-mail, an instant message, a chat room message, a newsgroup message such as an Internet newsgroup message, a wireless message such as Morse code modulated onto an electromagnetic RF carrier, an SMS (Simple Messaging Service) message, an MMS (Multimedia Messaging Service) message, an EMS (Enhanced Messaging Service) message, or a text or graphics pager message.

"Rendering" means converting an encoded message into human readable images and/or text that can be portrayed on a display device. In HTML, an image is rendered pursuant to an IMAGE tag.

"Character" is any computer-representable mark, such as an alphanumeric character, a special symbol like =- % or $, a peace symbol, a design, a trademark, a cartoon, graphics, etc. A character can be from any natural language.

"Natural language" is a language that is spoken and/or written by humans.

"Word" is a group of characters.

"Coupled" encompasses any type of coupling or connection, whether direct or indirect.

Figure 1:
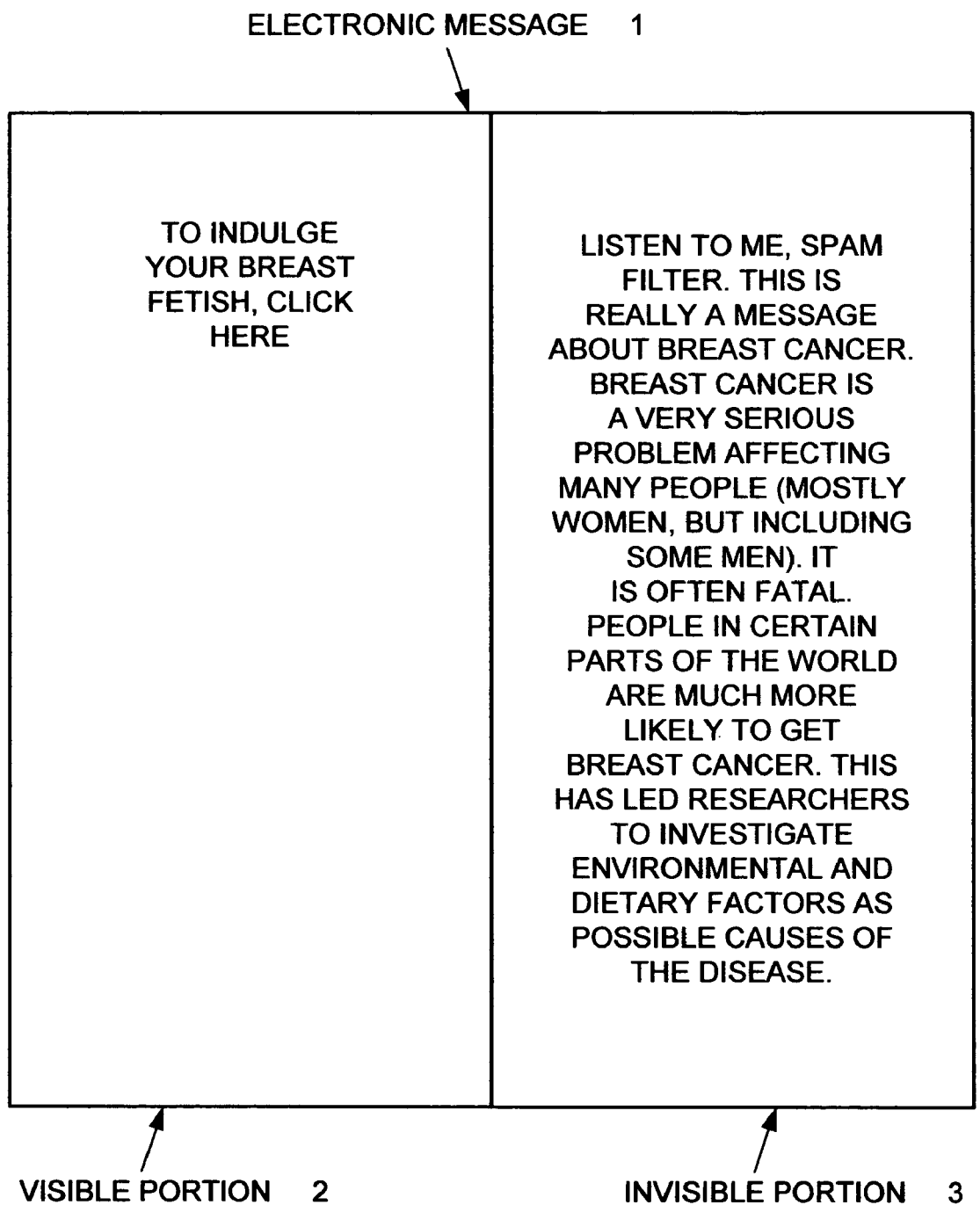
FIG. 1 illustrates an electronic message 1 that has been composed using a spamming technique of the existing art that is countered by the present invention.
Figure 2:
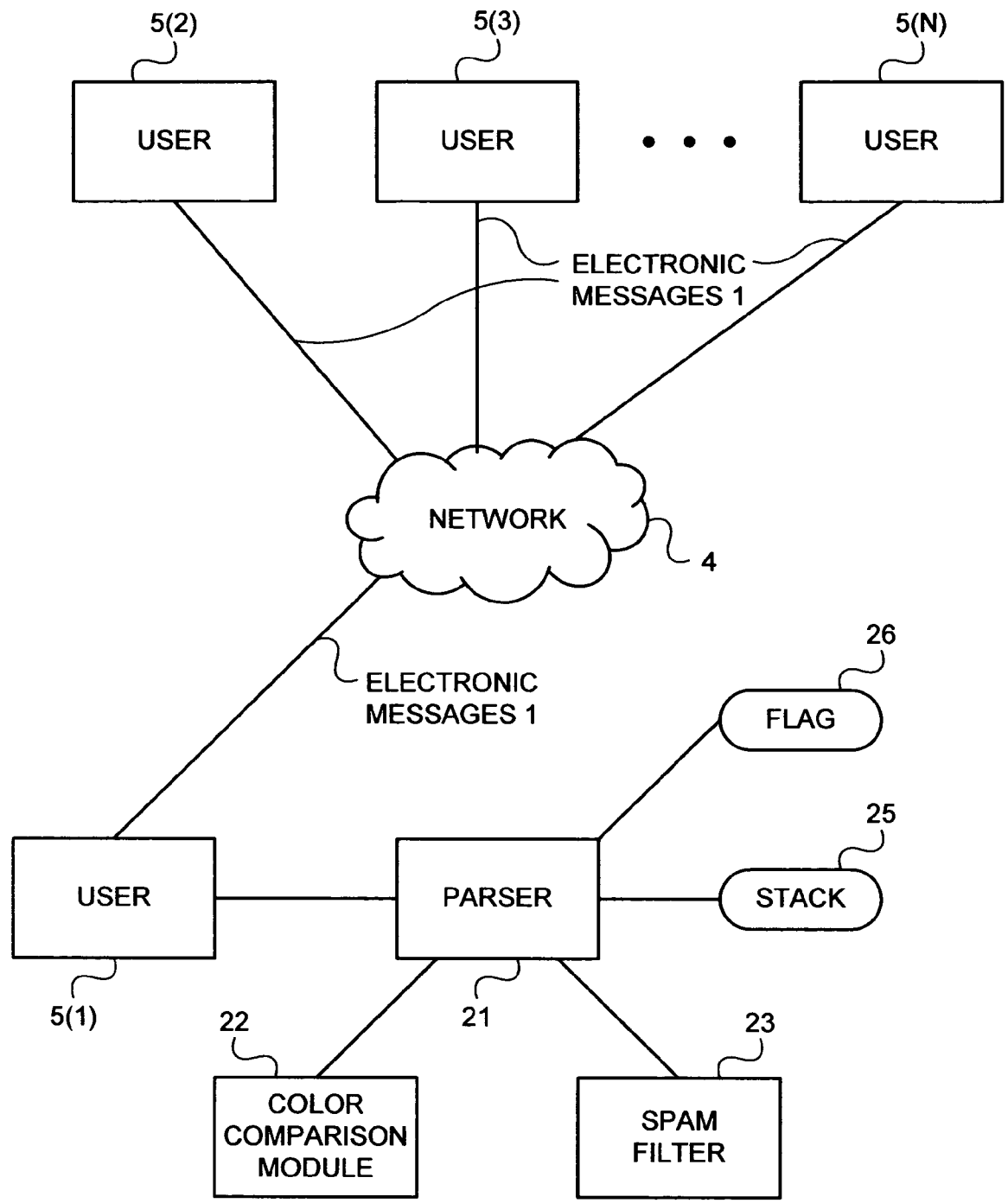
FIG. 2 is a diagram illustrating apparatus usable in carrying out the present invention.

With reference to FIG. 2, "user" refers to a computing device 5 and/or a human who has control of computing device 5. Device 5 is broadly defined herein as any type of computer or any type of device containing a computer. Thus, device 5 may be an individual client computer such as a personal computer (PC), laptop computer, handheld computer, etc.; an enterprise computer such as a workstation, gateway computer, or proxy computer; a two-way pager; or a messaging telephone.

User 5 sends and receives electronic messages 1 to and from a network 4. The network 4 may be any type of wired or wireless network, such as the Internet, the public switched telephone network (PSTN), a local area network (LAN), or a wide area network (WAN).

There can be a plurality N of user devices 5. They may be associated with some enterprise, e.g., a corporation, a university, a set of affiliated users 5 connected to each other by a local area network, etc.

"Foreground" of an electronic message 1 is the region or regions of the message 1 where information consisting of one or more characters is conveyed to the recipient user 5.

"Background" of an electronic message 1 is the region or regions of the message 1 other than foreground.

Spammers can make foreground characters invisible by changing the color of the foreground characters to match the color of the background or, conversely, by changing the color of the background to match the color of the foreground characters.

"Color" is a quality of visible phenomena having hue, saturation, and brightness.

"Hue" is that attribute of color in respect to which the color may be described as red, yellow, green, blue, or intermediates thereof. Hue is expressed in degrees from 0 to 359. 360 degrees of hue equals 0 degrees of hue.

"Saturation" is that attribute of color in which the color may be differentiated from another color as being higher or lower in degree of vividness of hue; that is, as differing in degree from gray. Saturation is expressed in percent, from 0% to 100%.

"Brightness" is that attribute of color which measures its position on the white to black scale. Thus, a dark gray has a low brightness, a medium gray has a medium brightness, and a light gray has a high brightness. Brightness is expressed in percent, from 0% to 100%.

"Gray-scale color" is a color having a saturation of zero percent.

"Hued color" is a color other than a gray-scale color.

A color is either a gray-scale color or a hued color.

To implement the present invention, a given user (arbitrarily illustrated as user 5(1) in FIG. 2) has associated therewith a parser 21, an optional color comparison module 22, and a spam filter (spam detection engine) 23. Parser 21 is a module that performs semantic analysis on messages 1. In the case where message 1 is e-mail, parser 21 is a HTML parser. Parser 21 is usually part of a renderer. Parser 21 has the capability of converting text (which might be in ASCII format) into a format more suitable for subsequent programming, e.g., binary. Parser 21 may comprise or be coupled to ancillary components such as a processing unit, comparison module, etc. These ancillary components are useful in assisting parser 21 to perform its duties as broadly described herein.

Coupled to parser 21 is optional color comparison module 22. The purpose of module 22 is to determine, for non-simple cases, which portions, if any, of message 1 are invisible or nearly invisible to a typical human user 5. Any such portions 3 are deleted by parser 21 before parser 21 sends the message 1 to spam filter 23.

Spam filter 23 is coupled to parser 21 and can be any type of spam filter that is influenced by characters within message 1, such as a machine learning based spam filter, a neural network, a Bayesian classifier, a support vector machine, a non-machine learning based spam filter, a fuzzy hash filter, a collaborative filter, an RBL filter, a white list/black list filter, etc.

Optional stack 25 and optional flag 26 are coupled to parser 21. Stack 25 and flag 26 each consist of any type of storage means, such as a register, RAM memory, state of a state machine, area on a hard drive, etc.

Modules 21, 22, 23, 25, and 26 can be implemented in software, firmware, hardware, or any combination thereof. When implemented in software, all or portions of said modules 21, 22, 23, 25, and 26 can reside on a computer-readable medium such as a hard disk, floppy disk, DVD, CD, etc, or on a plurality of such computer-readable media.

Figure 3:
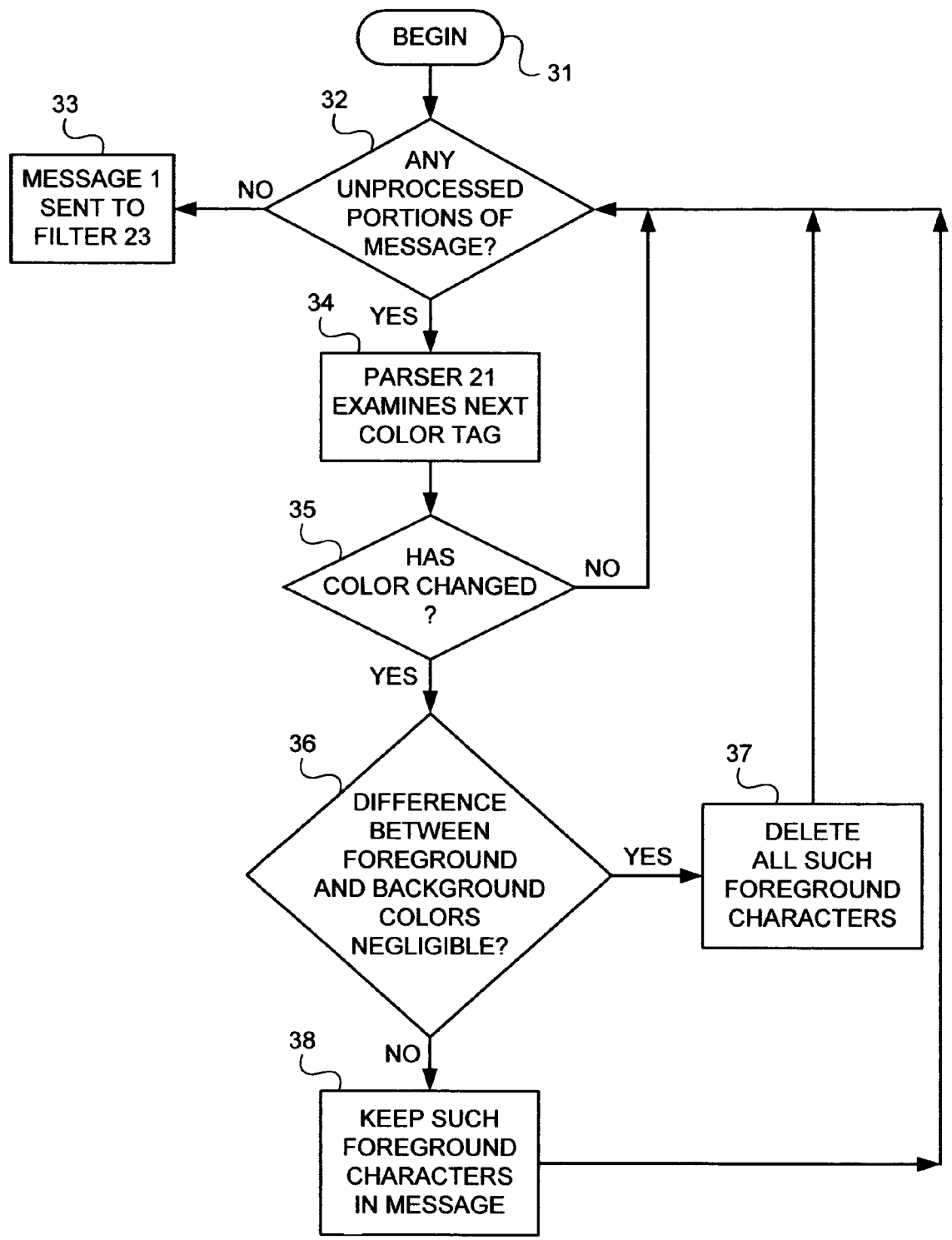
FIG. 3 is a flow diagram illustrating a method embodiment of the present invention.

The operation of the present invention will now be illustrated in conjunction with FIG. 3. The method begins at step 31. At step 32, parser 21 asks whether any portions of message 1 remain to be processed. If there any no such portions left to be processed, parser 21 (at step 33) sends message 1 to spam filter 23, where filter 23 processes message 1 in a manner that is normal and customary for filter 23.

If there are portions of message 1 remaining to be processed, the method proceeds to step 34, where parser 21 examines the next color tag within message 1. A color tag is any means by which the sender of message 1 has indicated a color in which a portion of message 1 will be rendered on a display associated with recipient computer 5. In HTML, there are several ways of providing color tags, including inline style, color attributes, background attributes, and style sheets. These are illustrated below:

Inline style:
<P style="color: white; background-color: black">This text is visible</P>

Color/background attributes:
<P><font color="white" background="black">This text is also visible</font></P>

Style sheets:
<STYLE>
.WhiteOnBlack {color: white; background-color: black}
.WhiteOnWhite {color: white; background-color: white}
</STYLE>
<P class="WhiteOnBlack">This text is visible</P>
<P class="WhiteOnWhite">This text NOT visible</P>

In the above example, color attributes have been combined with background attributes, but they could be separated from each other. Note that in each of the above examples, a color tag is preceded by a "less than" sign.

At step 35, parser 21 determines whether the present color tag being examined indicates that the color of either the foreground or the background has been changed by the present color tag. If not, the method reverts to step 32. If the color has changed, however, the method proceeds to step 36, where parser 21 determines whether the difference between the new foreground color and the new background color is negligible. This step 36 may or may not require the assistance of color comparison module 22. If the difference between the foreground and background colors is negligible (i.e., zero or very small), this indicates that the foreground is invisible or nearly invisible to the typical human user 5. Therefore, this portion of the message 1 is deleted by parser 21 at step 37, and the method reverts to step 32. At least the foreground characters from said portion are deleted; possible the entire portion, including background, is deleted.

If, however, the result of the analysis at step 36 indicates that the difference between the foreground and background colors is not negligible (i.e., the difference is greater than a small amount), this is the equivalent of saying that the foreground is visible to a typical human user 5, and therefore foreground characters from this portion are left in the message 1 by parser 21 at step 38. After execution of step 38, the method again reverts to step 32.

It can be seen from the above that invisible portions 3 of the message 1 are deleted from the message 1 before message 1 is processed by spam filter 23. This ensures that spam filter 23 is operating on just visible portions 2 of the message 1, as is the human user 5. Thus, the above described technique by which spammers attempt to trick spam filters is foiled.

An example of how parser 21 performs steps 34 through 38 for an e-mail message 1 will now be described. In this example, the e-mail message 1 comprises:
<P><font color="white" background="black">PURCHASE <font background="white">CONFIRMATION FOR</font>VIAGRA</font></P>

Parser 21 sees the expression "<P>". This indicates the beginning of a new paragraph in HTML. There is no color information within this tag (it is not inline style), so parser 21 goes on to examine the next characters. The parser then sees "<font" (step 34). This tells parser 21 that a new color tag has been encountered. Parser 21 decodes the tag to mean that there is a white foreground on a black background. In one embodiment, parser 21 puts the expression "WhiteOnBlack" onto stack 25. Stack 25 may be a FILO (First In Last Out) stack. Parser 21, by means of semantic analysis, determines (step 36) that this combination is visible, and in one embodiment sets flag 26 to "visible". Since flag 26 is set to "visible", parser 21 at step 38 sends the next word ("PURCHASE") to filter 23, either immediately or after the entire expression has been decoded. In the case where the next word is sent to filter 23 after the entire expression has been decoded, parser 21 temporarily stores the next word in a buffer memory.

Next, parser 21 encounters (step 34) another color tag, indicating that the background color has changed to white. So now parser 21 knows through simple analysis (step 36) that the foreground and background colors are both white, and that the foreground is therefore invisible to the user 5. In one embodiment, parser 21 pushes the expression "WhiteOn-White" onto the stack 25 and sets flag 26 to "invisible". Since flag 26 is set to "invisible", parser 21 deletes (step 37) all characters until the next color tag, i.e., the characters "CON-FIRMATION FOR", from message 1. Parser 21 then encounters an end-tag ("</font>"). This causes parser 21 to take the most recent item ("WhiteOnWhite") off stack 25. Now the item at the top of stack 25 is "WhiteOnBlack", so parser 21 resets flag 26 to "visible". Thus, parser 21 sends the next word ("VIAGRA") to filter 23 at step 38.

The words "PURCHASE VIAGRA" are visible to the human user 5 since they comprise white text or black background, and the words "CONFIRMATION FOR" are invisible 3 to the human user 5, because they comprise white text on a white background. The spammer is attempting to feed the words "PURCHASE CONFIRMATION FOR VIAGRA" to spam filter 23, because many spam filters, upon seeing the words "PURCHASE CONFIRMATION", will treat the message 1 as being clean, thinking that user 5 has made a previous on-line purchase and that message 1 is simply a confirmation thereof. However, as can be seen from the above, the present invention has deleted the words "CONFIRMATION FOR" from message 1, and has sent just the words "PURCHASE VIAGRA" to the spam filter 23.

The above is a relatively simple example, wherein parser 21 can simply compare the words "white" and "black" to see whether the foreground and background colors are the same or substantially the same. When more sophisticated colors are used, color comparison module 22 is invoked to make this decision.

Instead of simple "white" and "black", the HTML can specify: color="#001767"

This is hexadecimal notation for a dark purple. The numbers following the "#" comprise three components, each having two digits. All of these components can range from zero decimal to 255 decimal. The first two digits (00) specify the red component of the color, the second two digits (17) specify the green component of the color, and the last two digits (67) specify the blue component of the color. In decimal notation, this is equivalent to a red component of zero, a green component of 23, and a blue component of 103.

Similarly, the HTML can specify:
background="#0E147A"

This is also hexadecimal notation for a purple color wherein, in decimal notation, the red component is 14, the green component is 20, and the blue component is 122.

In one embodiment of the present invention, the red, green, and blue components are converted to hue, saturation, and brightness components using a conventional algorithm. This algorithmic conversion can be performed by parser 21 or by color comparison module 22. In the above example, red zero, green 23, blue 103 converts to a hue of 227 degrees, a saturation of 100%, and a brightness of 40%. Similarly, red 14, green 20, blue 122 converts to a hue of 237 degrees, a saturation of 89%, and a brightness of 48%. Color comparison module 22 is then invoked by parser 21, to determine whether the difference between the foreground color and the background color is negligible or not. The negligibility threshold can be pre-selected by trial and error, i.e., difference between foreground color and background color being "negligible" means that a typical human user 5 finds the foreground characters to be invisible.

In one embodiment, color comparison module 22 makes a distinction between gray-scale color and hued color. In this embodiment, gray-scale color comparison parameters are invoked whenever the saturation value of either the foreground or the background is zero, or when the saturation of both the foreground and the background is zero; and hued color comparison parameters are invoked in all other cases.

For gray-scale color, hue makes no'difference. Only the saturation and brightness values need be compared. In one embodiment in which gray-scale color comparison parameters are invoked, if the difference in saturation values between the foreground and background is less than 5% and the difference in brightness values between the foreground and background is less than 4%, the foreground color is deemed to be invisible, i.e., the difference between the foreground color and background color is deemed to be negligible. These parameters are appropriate for when the display (monitor) associated with recipient user 5 is a CRT (Cathode Ray Tube). A CRT is weaker than an LCD (Liquid Crystal Display) monitor for gray-scale colors. For LCD monitors, appropriate criteria for declaring the foreground color to be invisible are that the saturation difference is less than 3% and the brightness difference is less than 2%.

For comparison of hued color values, in one embodiment, particularly useful when the recipient user's monitor is a LCD monitor, the foreground color is deemed to be invisible when the difference in hue between the foreground and background is less than 6 degrees, and the combined brightness and saturation difference is less than 14%. For hued colors, an LCD monitor is weaker than a CRT monitor, so, for a CRT monitor, in one embodiment, the foreground color is deemed to be invisible when the difference in hue between the foreground and background is less than 4 degrees, and the combined brightness and saturation difference between the foreground and background is less than 12%.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A method for countering spam that disguises characters within an electronic message, the method implemented on a computer, the method comprising the steps of:
   locating portions of the electronic message where a difference in color between foreground color and background color is negligible, the locating performed by a processor of the computer, the locating comprising:

determining whether at least one of the foreground color and the background color is a gray-scale color; and responsive to at least one of the foreground color and the background color being a gray-scale color, determining a difference in saturation between the foreground color and the background color, determining a difference in brightness between the foreground color an the background color, and deeming the difference in color between the foreground color and the background color to be negligible based on the difference in the saturation and the difference in brightness between the colors regardless of hue values of the colors, said deeming further comprises:

determining that the difference between the colors falls below a negligibility threshold, the negligibility threshold used depending upon a type of monitor on which the electronic message is to be displayed;

deleting from the electronic message foreground characters from said portions, to form a redacted electronic message; and forwarding the redacted electronic message to a spam filter.

2. The method of claim 1 wherein the negligibility threshold is set such that when the difference between foreground color and background color is below the negligibility threshold for a certain portion of the electronic message, said portion is invisible or illegible to a typical human viewer of the electronic message.

3. The method of claim 2, further comprising:

responsive to at least one of the foreground color and the background color being a gray-scale color, comparing the negligibility threshold to a color difference value, the color difference value based on the differences in saturation values and brightness values of the foreground and background colors.

4. The method of claim 2, wherein the negligibility threshold used when the electronic message is to be displayed on a liquid crystal display (LCD) monitor is different than a negligibility threshold used when the electronic message is to be displayed on a cathode ray tube (CRT) monitor.

5. The method of claim 2, wherein at least one of the foreground color and the background color is a gray-scale color, and wherein a negligibility threshold used when the electronic message is to be displayed on a liquid crystal display (LCD) monitor is less than a negligibility threshold used when the electronic message is to be displayed on a cathode ray tube (CRT) monitor.

6. The method of claim 1 wherein said locating step comprises, responsive to neither the foreground color nor the background color being a gray-scale color, comparing hue, saturation, and brightness of the foreground and background colors.

7. The method of claim 1 wherein the difference between the foreground color and the background color is deemed to be negligible when the difference in saturation between foreground and background is less than 5%, and the difference in brightness between foreground and background is less than 4%.

8. The method of claim 1 wherein the difference between the foreground color and the background color is deemed to be negligible when the difference in saturation between foreground and background is less than 3%, and the difference in brightness between foreground and background is less than 2%.

9. The method of claim 1 wherein neither the foreground color nor the background color is a gray-scale color, and the locating step comprises comparing hue, saturation, and brightness of the foreground and background colors.

10. The method of claim 9 wherein the difference between the foreground color and the background color is deemed to be negligible when the difference in hue between foreground and background is less than 4 degrees, and the combined difference in saturation and brightness values of the foreground and background is less than 12%.

11. The method of claim 1 wherein the spam filter detects spam to based on characters within the redacted electronic message.

12. The method of claim 1 wherein the electronic message is a message from the group of messages consisting of: e-mail, instant messages, chat room messages, newsgroup messages, wireless messages, Morse code messages, SMS messages, MMS messages, EMS messages, text pager messages, and graphics pager messages.

13. The method of claim 1, wherein determining whether at least one of the foreground color and the background color is a gray-scale color comprises:

determining whether the saturation value of at least one of the foreground color and the background color is zero.

14. The method of claim 1 wherein locating portions of the electronic message where the difference between foreground color and background color is negligible further comprises:

locating color tags in the electronic message, the color tags specifying foreground and background colors; and dividing the electronic message into portions based on the color tags, wherein different portions have different foreground or background colors.

15. The method of claim 1, wherein one of the foreground color and the background color comprises a gray-scale color and another one of the foreground color and the background color comprises a non-gray-scale color.

16. A non-transitory computer-readable storage medium containing executable computer program instructions for countering spam that disguises characters within an electronic message, said computer program instructions performing the steps of:

locating portions of the electronic message where a difference in color between foreground color and background color is negligible, the locating comprising:

determining whether at least one of the foreground color and the background color is a gray-scale color; and responsive to at least one of the foreground color and the background color being a gray-scale color, determining a difference in saturation between the foreground color and the background color, determining a difference in brightness between the foreground color an the background color, and deeming the difference in color between the foreground color and the background color to be negligible based on the difference in the saturation and the difference in brightness between the colors regardless of hue values of the colors, said deeming further comprises:

determining that the difference between the colors falls below a negligibility threshold, the negligibility threshold used depending upon a type of monitor on which the electronic message is to be displayed;

deleting from the electronic message foreground characters from said portions, to form a redacted electronic message; and forwarding the redacted electronic message to a spam filter.

17. The non-transitory computer-readable storage medium of claim 16 wherein the locating step comprises, responsive to neither the foreground color nor the background color being a gray-scale color, comparing hue, saturation, and brightness of the foreground and background colors.

18. The non-transitory computer-readable storage medium of claim 16, wherein determining whether at least one of the foreground color and the background color is a gray-scale color comprises:
   determining whether the saturation value of at least one of the foreground color and the background color is zero.

19. An apparatus for countering spam in an electronic message, said apparatus comprising: at least one processor;
   at least one non-transitory computer-readable storage medium containing executable computer program instruction for countering spam that disguises characters within an electronic message, said computer program instructions performing the steps of:
      locating portions of the electronic message where a difference in color between foreground color and background color is negligible, the locating comprising:
         determining whether at least one of the foreground color and the background color is a gray-scale color; and responsive to at least one of the foreground color and the background color being a gray-scale color, determining a difference in saturation between the foreground color and the background color, determining a difference in brightness between the foreground color an the background color, and deeming the difference in color between the foreground color and the background color to be negligible based on the difference in the saturation and the difference in brightness between the colors regardless of hue values of the colors, said deeming further comprises:
            determining that the difference between the colors falls below a negligibility threshold, the negligibility threshold used depending upon a type of monitor on which the electronic message is to be displayed;
      deleting from the electronic message foreground characters from said portions, to form a redacted electronic message; and
      forwarding the redacted electronic message to a spam filter.

20. The apparatus of claim 19 wherein the locating means comprises a color comparison module.

\* \* \* \* \*